Sept. 23, 1969  R. J. KINNEY  3,468,502

PARACHUTE RELEASE DEVICE

Filed May 8, 1967  5 Sheets-Sheet 1

INVENTOR
RICHARD J. KINNEY

BY Stevens, Davis, Miller & Mosher
ATTORNEYS

INVENTOR
RICHARD J. KINNEY
BY Stevens, Davis, Miller & Mosher
ATTORNEYS

INVENTOR
RICHARD J. KINNEY

INVENTOR
RICHARD J. KINNEY

BY Stevens, Davis, Miller & Mosher
ATTORNEYS

United States Patent Office 3,468,502
Patented Sept. 23, 1969

3,468,502
PARACHUTE RELEASE DEVICE
Richard J. Kinney, Springfield, Va., assignor to Halliburton Company, Duncan, Okla., a corporation of Delaware
Filed May 8, 1967, Ser. No. 637,001
Int. Cl. B64d 17/58; B64c 13/04; F16h 5/74
U.S. Cl. 244—150                           18 Claims

ABSTRACT OF THE DISCLOSURE

In a parachute release device including a piston, a parachute release cable connected to the piston, spring means biasing said piston to a release position and a release mechanism to hold the piston in a retracted position against the force of the spring means and to release the piston responsive to a predetermined time lapse, the improvement comprising said release mechanism including a timing cam mounted relative to a fixed axis, said timing cam including a cam surface terminating in a breakaway edge, a lever pivotally mounted on said fixed axis, a cam follower to engage the cam surface and pivotally mounted on said lever with the pivot axis being spaced from said fixed axis so that pivoting of said lever advances the cam follower toward the breakaway edge, timing means to govern pivoting of said lever, and a trigger coupled to said cam follower and adapted to hold the piston retracted while said cam follower engages said cam surface and to release same responsive to the cam follower overriding the breakaway edge.

---

The present invention relates to an automatic parachute release device and more particularly to a device with time and altitude memory capabilities and in which the run down time set in the device is variable.

Parachute release devices are known which automatically pull upon reaching a predetermined altitude and after a predetermined time period has run. These devices normally comprise clock and barometric control for automatically disengaging a catch member permitting a compressed power spring to force the rip cord through a predetermined throw. One conventional device has a clockwork mechanism with a non-variable five second run down. In the time mode, the run down is uninterrupted; however, in the time-altitude mode, the clock is stopped at two seconds by the barometric control. Upon the jumpers' reaching the predetermined altitude, the aneroid releases the clock and permits it to run the last two seconds after which the parachute is released. The clockwork mechanism of these devices is such that variable time-settings are not permitted and if time is used at all it must be for the amount of seconds built into the apparatus.

Other release devices have a variable time-setting capability as well as an aneroid control. However, these devices comprise a spiral power spring and a complex mechanism which requires periodic inspection and maintenance. The unusually complex nature of the control mechanism makes this apparatus a less reliable instrument in view of the importance of its function.

It is a primary object of the present invention to provide a parachute release device with a clockwork mechanism, the setting of which is adjustable for a range of seconds and which includes a non-complex and highly reliable breakaway camming mechanism which quickly and freely permits the compressed power spring to force the cable to the release position.

In brief, the cocked power spring forces a roller rearward against a trigger and power lever which is rotatably mounted to a moving pivot carried by a sector gear rotatably mounted to a fixed pivot forward of said moving pivot. The power spring thus rotates the sector gear and moving pivot about the fixed pivot. The sector gear drives a series gear train, a reset ratchet, and an escapement mechanism. As the sector gear rotates, a timing cam roller on the power lever runs on one surface of an adjustable timing cam which prevents rotation of the trigger about the moving pivot until the timing cam roller overrides a sharp breakaway edge which permits the trigger to freely rotate about the moving pivot thus releasing the power spring. The length of time that the timing cam roller movably engages the timing cam before breakaway is easily adjustable by changing the angular position of the timing cam relative to the fixed pivot.

The present invention also has an arm control which when in the "off" position locks movement of a pivoted catch plate. The catch plate has a cammed groove receiving a stud of a pivoted lever arm which in turn is rotated by a post mounted on the movable sector gear. As the post rotates the lever, the stud rides along the groove and rotates the catch plate. The catch plate is provided with red and green areas. The red area shows through a window when the device is unarmed. After cocking the power spring and inserting the static pin, the arm control can be turned to "on" and the clock mechanism runs through an arm time period of four or five seconds and the catch plate rotates to contact the static pin. At this time the green area shows through the window so that the jumper knows that the power spring is cocked and the arm control is in the "on" position.

The device is provided with an adjustable aneroid bellows having a bellows post which engages the catch plate at about the same angular position as does the static pin. In the time mode, the bellows post is retracted so that after the static pin is pulled only the set time period runs to release the power spring. In the altitude mode, the clockwork mechanism is set at one second so that the bellows post blocks the catch plate after the static pin is removed, and when the predetermined altitude is reached, the bellows post releases the catch plate to allow the one second to lapse after which the parachute is released.

It is therefore another object of the present invention to provide a parachute release device with a highly reliable and quickly adjustable time and altitude control mechanism.

It is a further object of the present invention to provide a parachute release device with an arm control and arm timer which permits the catch plate to engage the static pin so that the jumper knows the device is cocked and armed.

It is another object of the present invention to provide a parachute release device with a clockwork mechanism having a sector gear carrying a sector gear post operating a lever which has a stud fitted to rotate the catch plate by riding along a cammed groove therein.

It is yet a further object of the present invention to provide a parachute release device which includes a clockwork mechanism driving a gear train and escapement through a reset ratchet. The clockwork mechanism is provided with a number of reset springs so that the clock and power lever are reset substantially immediately after the power spring is released.

Other and further objects of the present invention will become apparent with the following detailed description when taken in view of the appended drawings in which.

Figure 1:
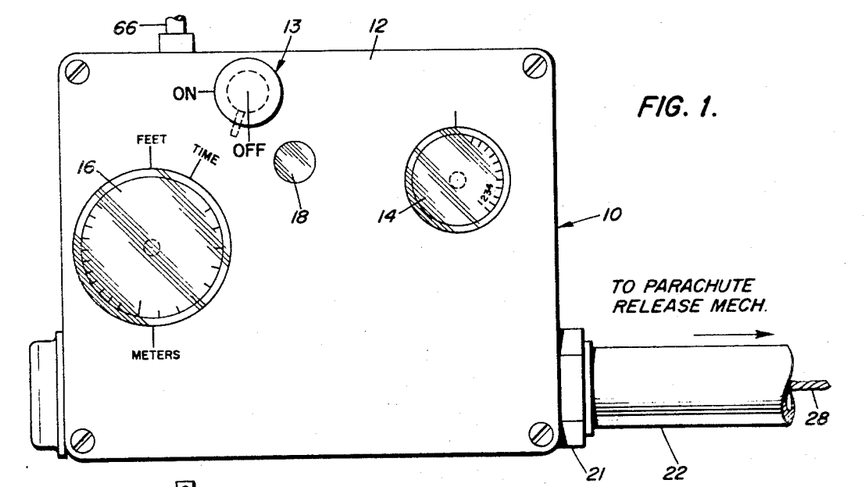
FIGURE 1 is a top plan view of the parachute release mechanism of this invention.

Referring to the drawings in detail, the parachute release device 10 comprises a housing 12 having a time dial window 14 and an altitude dial window 16 in the top face thereof. A third small window 18 shows a color, red or green, which informs the jumper whether or not the device is armed and cocked. An elongated tube 22 is secured within housing 12 and has its forward end threaded within cap opening 20. Lock nut 21 is threaded on the outside of tube 22 and locks against housing 12. A bumper member 24 is provided at the rear end of tube 22 to absorb the shock of the driving spring. Tube 22 houses the power spring 26 through which the standard automatic parachute draw cord 28 extends. The forward end of cord 28 is securely attached to piston 30 which rides in tube 22 and has an inward facing pivoted roller 32 supported on a small yoke 34 which rides along a longitudinal slot 35 in tube 22. Spring 26 can be of any suitable size such as, for example, delivering 60 pounds when fully compressed in order to provide a positive and quick movement of piston 30 when retaining roller 32 is freed.

Figures 3, 11, 12:
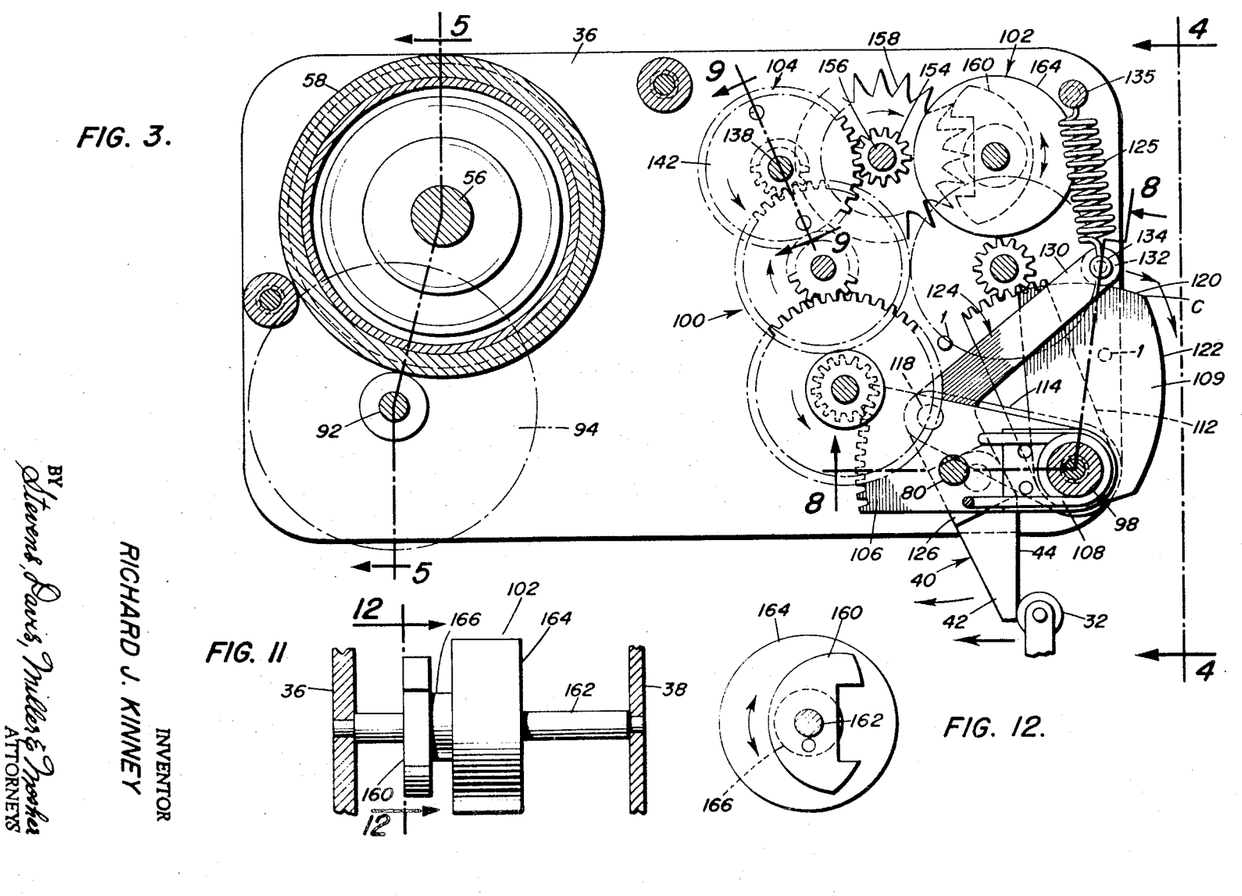
FIGURE 3 is a plan view partially in section of the clockwork drive mechanism taken on a plane just below mounting plate 38 as seen in FIGURE 2.
FIGURE 11 is an end elevation view of the escapement mounted on its shaft, with the outer casing shown in section.
FIGURE 12 is a side view of the escapement taken along line 12—12 of FIGURE 11.
Figure 4:
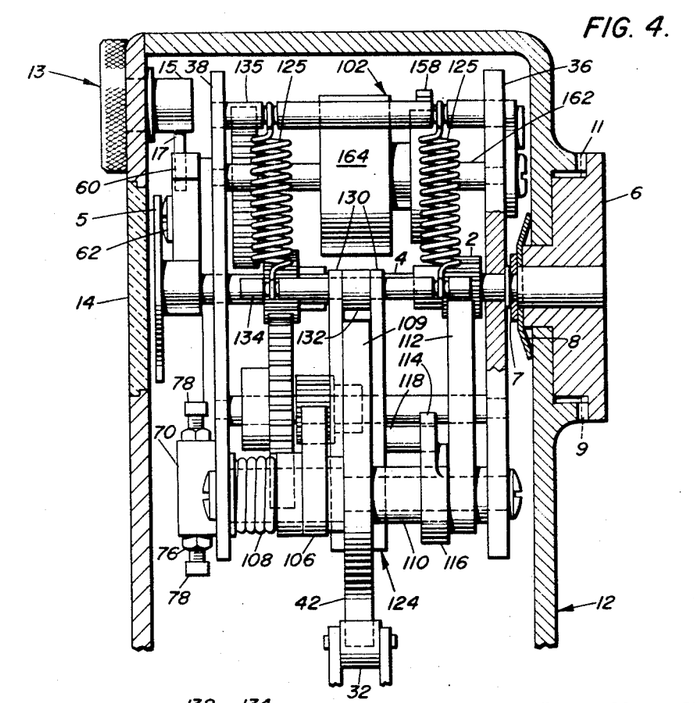
FIGURE 4 is an end elevation taken along line 4—4 of FIGURE 3 showing the clockwork mechanism and trigger assembly with the outer casing shown in section.

With reference to FIGURE 3, the timer assembly and aneroid bellows are positioned between a pair of parallel mounting plates 36 and 38 mounted parallel with the top and bottom of housing 12 and spaced by a number of posts and shafts. The trigger assembly 40 is tied into the clockwork assembly in a manner described below and includes a trigger 42 with a flat forward surface 44 which is aligned with slot 35 and extends toward tube 22. The forward surface 44 blocks movement of piston roller 32 when spring 26 is compressed and the device is fully cocked.

Figure 2:
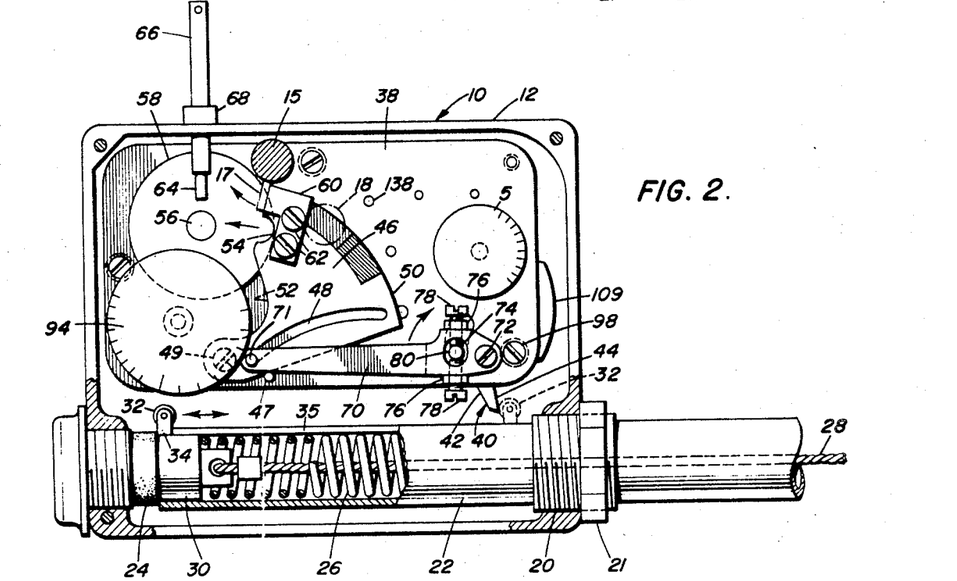
FIGURE 2 is a top plan view of the parachute release mechanism of FIGURE 1 with the top cover plate removed.

As better seen in FIGURE 2, catch plate 46 is pivoted about a stationary axis 49 above plate 38 and its clockwise rotation is limited by contact with pin 47 on plate 38. Catch plate 46 is provided with a cammed slot 48 extending from a point near pivot 49 outward along the forward edge to a point near the outer arcuate edge 50 of plate 46. The rear edge 52 defines a groove or depression 54 shaped to cooperate and engage the exposed bellows post 56 of the aneroid bellows 58 whenever post 56 extends above plate 38. Immediately outward from depression 54 there is arranged an L-shaped plate 60 made of a tougher metal than plate 46 and secured thereto by a pair of screws 62. The back edge 63 of plate 60 is generally aligned with the back edge of plate 46 and is radially aligned to engage the inserted forward end 64 of a static pin 66 connected to the aircraft static line (not shown) and which penetrates housing 12 through a collared opening 68.

Mounted on the cover plate of housing 12 is an arm control knob 13 which has a reduced shaft 15 extending into the casing and provided with a stop pin 17 positioned to engage plate 60 preventing rotation of plate 46. The set position of knob 13 is frictionally maintained by a spring washer (not shown) or any other suitable means. Clockwise rotation of knob 13 to the "on" position moves stop pin 17 from the blocking position relative to plate 46.

Also provided on the top of plate 38 is a rotating lever 70 pivotally secured by screw 72 threaded in plate 38 in alignment with and forward of axis 49 of plate 46. Lever 70, extending rearward, is spaced above plate 46 and has a depending stud 71 at its rear end penetrating slot 48. When lever 70 is rotated about axis 72, stud 71 travels in an arc about axis 72 and carries that part of the slot 48 which it engages along its same arc of travel. By this action, plate 46 is rotated counterclockwise unless otherwise restrained.

The forward end of lever 70 is enlarged and defines an oval opening 74; the enlarged portion is further provided with a pair of transversely aligned set screws 78 provided with lock nuts 76 which cooperate to form a clamp about a sector gear post 80 connected to the clockwork mechanism in a manner described below.

Plate 38 is provided with an enlarged arcuate slot permitting post 80 to move arcuately about axis 98. It is apparent that arcuate movement of post 80 rotates lever 70 which in turn rotates plate 46 as described. However, it should be understood that the lever action of lever 70 on plate 46 amplifies the amount of angular movement of post 80 so that arcuate movement thereof of only a few degrees causes a substantial rotation of plate 46. In addition, only a small force is required to restrain rotation of plate 46 which in return prevents rotation of post 80 for purposes described below.

Figure 5:
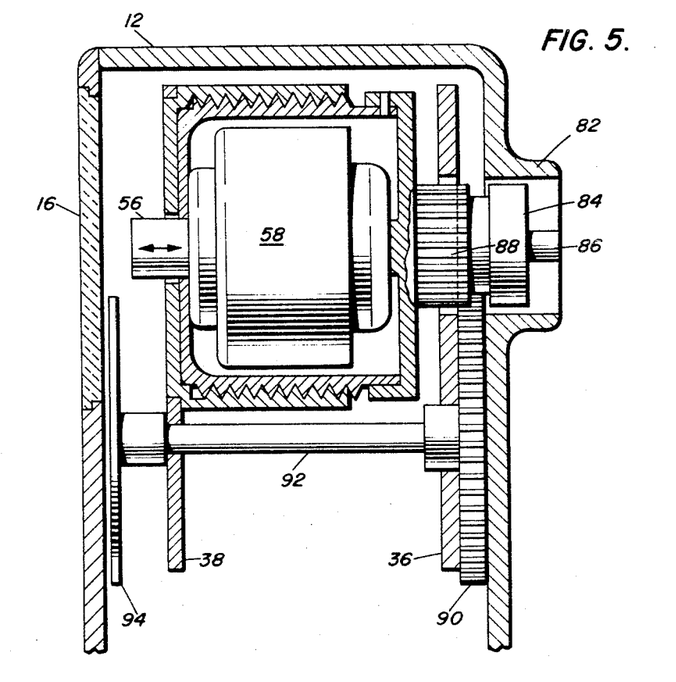
FIGURE 5 is a vertical cross-sectional view through the aneroid mechanism taken along line 5—5 of FIGURE 3.

The aneroid bellows 58 is a standard piece of equipment that, for example, has a minimum setting of 900 feet and a maximum setting of 13,000 feet. As seen in FIGURE 5, the bellows post 56 protrudes upward from the aneroid bellows body 58, and at above the preset altitude, bellows post 56 penetrates plate 38 engaging depression 54 of plate 46. Adjustment of aneroid bellows 58 is accomplished through opening 82 in the back face of housing 12. Shaft 84 extends from aneroid bellows 58 and has a flange 86 to permit manual rotation thereof for conventional adjustment of aneroid 58. A small spur gear 88 mounted to and turning with shaft 84 meshes with a larger gear 90 pinned to a vertical shaft 92 which penetrates plate 38 and supports at its upper end the set altitude indicator dial 94 positioned to be seen through window 16. Dial 94 is positioned sufficiently above plate 38 to enable free rotation of plate 46 thereunder without contacting or binding the same.

The timing assembly mechanism will now be described. The timing mechanism comprises a time-setting and sector gear assembly 96 which includes a stationary sector gear axis 98 arranged between plates 36 and 38 at a position just forward of the stationary pivot 72 for lever 70. The time-setting and sector gear assembly 96 drives a gear train 100 which in turn drives an escapement mechanism 102 through a reset ratchet 104. As seen in FIGURE 3, escapement mechanism 102 includes a ratchet wheel 158 rigidly mounted on shaft 156 which is driven by reset gear 142 through pinion 154. Clockwise rotation of ratchet wheel 103 is time-controlled by escape pawl 160 rigidly attached to inertial balance wheel 164. Pawl 160 will lock ratchet wheel 103 against counterclockwise rotation, thus causing gear 142 to be held stationary during the resetting operation.

The time-setting and sector gear assembly comprises a sector gear or arm 106 rotatably mounted to axis (shaft) 98 and extending rearward therefrom. The top of sector gear 106 is provided with a hole which secures one end of a coil spring 108, the other end of which is fixed in by plate 38. The spring 108 functions to reset gear 106 and normally biases the gear in the counterclockwise direction to a reset position shown in FIGURE 3. Also rotatably mounted on axis 98 is a timing cam 109 integrally connected to a collar 110 and to a time-setting gear 112. Thus, the angular relationship between timing cam 109 and time-setting gear 112 is fixed. However, both are rotatable relative to axis 98. To vary the run down time setting, a spur gear 2 held on shaft 4 meshes with time-setting gear 112. Shaft 4 is held by plates 36 and 38 and has a time dial 5 secured to its free end in alignment with window 14. A time control knob 6 is fixed to the other end of shaft 4 and is held by a retaining ring 7 on shaft 4 and spring washer 8 on the inner part of knob 6 which biases knob 6 inward so that keys 9 seat within recesses 11 of the annular boss of housing 12. A plurality of recesses 11 are provided so that keys 9 can retain shaft 4 in any one of a suitable number of angular positions.

To reset the run down time, knob 6 is pulled outward against the bias of spring 8, then rotated to the new position and released so that keys 11 seat in recesses 11. Rotation of shaft 4 causes gear 2 to correspondingly rotate time-setting gear 112 and the timing cam 109. Pins 1 mounted in plate 36 engage time-setting gear 112 limiting the maximum and minimum degree of rotation (run down time) for timing cam 109. In one example, the minimum setting for timing cam 109 may be five seconds so that after a four second prearm time elapses, a minimum one second run down time remains. A maximum setting may be, for example, 10 seconds after prearm.

Figure 8:
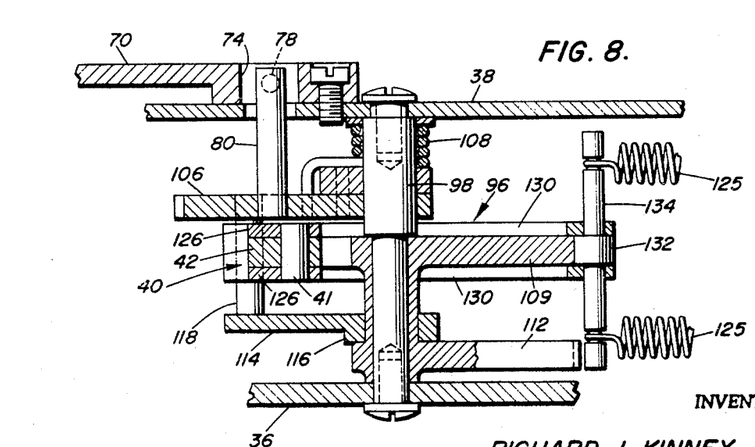
FIGURE 8 is a vertical section taken along line 8—8 of FIGURE 3 showing the details of the time-setting and sector gear assembly.

As seen in FIGURE 8, the timing cam 109 is positioned immediately below sector gear 106 and the time-setting gear 112 is at the bottom of axis 98 near plate 36. A support link 114, with an integral collar 116 is rotatably mounted on collar 110 between time-setting gear 112 and timing cam 109. A shaft 118 has its ends securely fastened in sector gear 106 and the support link 114. Thus, the sector gear 106 and support link 114 are joined together and rotate together about axis 98. Power lever 124 is pivotally mounted on shaft 118 between gear 106 and link 114.

The aforementioned sector gear post 80 is arranged and spaced rearward of axis 98 and has its lower end rigidly carried by sector gear 106. As mentioned above, sector gear post 80 extends through plate 38 and cooperates with the clamping screws 78 associated with lever 70.

The timing cam 109 has two important surfaces, namely, the outermost edge 120 which is arcuate generally about the axis 98 and the forward edge 122 which is arcuate generally about pin 118. Edges 120 and 122 intersect at a sharp breakaway point C for reasons set forth below.

Figure 6:
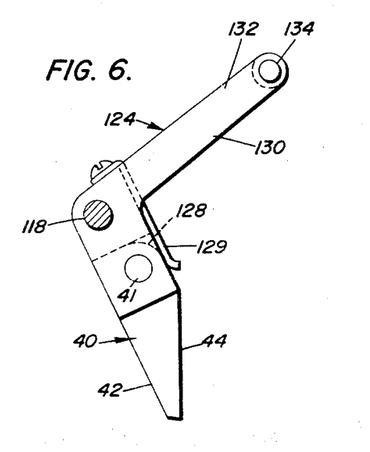
FIGURE 6 and FIGURE 7 are side and end elevations, respectively, of the power arm assembly.
Figure 7:
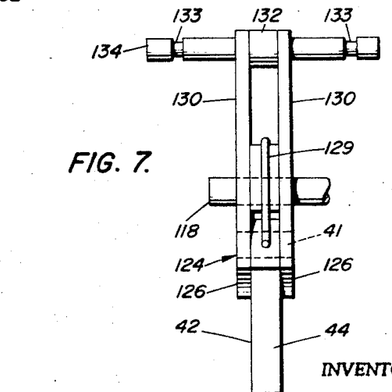

Assembly 96 further includes an L-shaped power lever 124 which carries the aforementioned trigger 42 about pin 41, said trigger 42 being rotatable between two flanges 126. One side of pivoted end 128 of trigger 42 is rounded to enable forward rotation thereof about pin 41. However, the other side of pivoted end 128 of trigger 42 is flat so that relative clockwise rotation thereof is prevented. Reset leaf spring 129 biases trigger 42 toward the position shown in FIGURE 6. Power lever 124 further comprises a pair of spaced arms 130 straddling the timing cam 109 and joined at their free ends by a time cam roller 132 rotating on an elongated pin 134. Power lever 124 is rotatably carried by shaft 118 rigid with sector gear 106. With this arrangement when the piston is cocked, piston roller 32 rotates trigger 42 counterclockwise sufficiently to clear it and then bears against forward face 44 until trigger 42 is tripped.

Pin 134 extends beyond arms 130 and has a pair of circumferential grooves 133 spaced on opposite ends thereof. Supporting post 135 connecting plates 36 and 38 is also provided with a pair of similarly spaced grooves, and a pair of coil reset springs 125 are retained by the recesses and extend from post 135 to shaft 134 and serve to reset the power lever 124.

Figure 9:
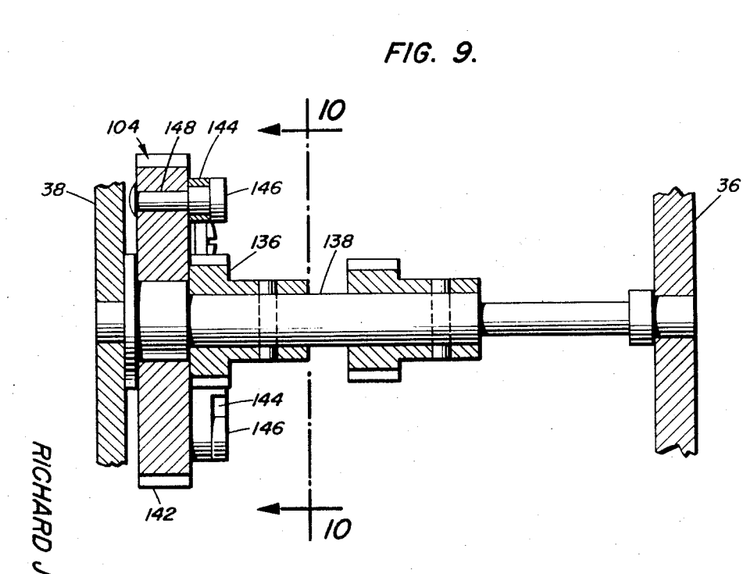
FIGURE 9 is a sectional view taken along line 9—9 of FIGURE 3 showing the details of the reset ratchet assembly.
Figure 10:
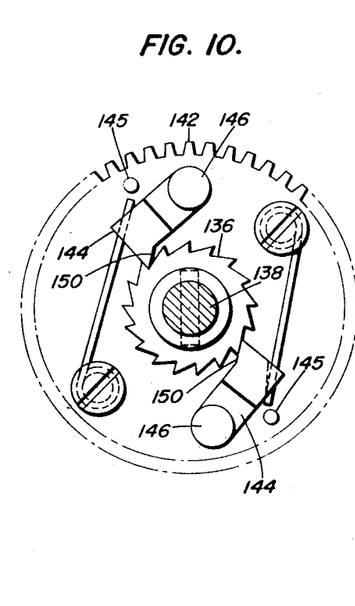
FIGURE 10 is a sectional view taken along line 10—10 of FIGURE 9.

When piston 30 is in a cocked position, roller 32 bears against trigger 42, but since cam roller 132 cannot rotate about pin 118 due to its contact with edge 120 the result is that the moment developed about axis 98 is imparted through pin 118 to sector gear 106. This action rotates sector gear 106 in a clockwise direction which in turn carries pin 118 in the same direction about axis 98. In the event sector gear 106 is free to rotate, it drives a series of power step-down gears 100, in this example, a series of spur gears. The last spur gear drives a reset ratchet mechanism generally indicated as 102 and better seen in FIGURES 9 and 10 which includes a small ratchet wheel 136 rigid with shaft 138 by virtue of a transverse pin 138 extending therethrough. A second larger gear 142 is rotatably mounted on shaft 138 and in flush engagement with wheel 136. A pair of oppositely arranged, spring biased pawls 144 are secured on the lower face of wheel 142 by rivets 146 extending through openings 148 in gear 142 and peened over the top thereof. Pawls 144 rotate about rivets 146 and are provided with a cammed surface 150 which ride over the teeth of wheel 136 when the latter is rotated counterclockwise and further provided with a flat surface 142 which locks pawls 144 with wheel 136 when the latter rotates clockwise. With pawls 144 locked to wheel 136, the free turning wheel 142 is thus forced to rotate with shaft 138 and the last spur gear in gear train 100. Pins 145 held by gear 142 prevent pawls 144 from falling away in the event the bias thereon fails.

When rotating with shaft 138, reset gear 142 drives pinion 154 rigidly mounted on shaft 156 which in turn drives escapement ratchet wheel 158 having teeth shaped generally as shown. The escapement 102 is mounted to an adjacent shaft 162 and includes an inertia wheel 164 pinned to a U-shaped escapement pawl 160 and an enlarged spacer 166 formed integrally with shaft 162. The escapement pawl 102 is positioned and arranged such that the teeth of wheel 158 periodically engage the legs of pawl 160 to rotate the same and the other elements of escapement 102 first in one direction and then in the other at a predetermined rate when spring 26 has a given compression force. Pawl 160 also prevents counterclockwise rotation of ratchet wheel 103 and thus prevents clockwise rotation of reset gear 142.

The operation of the device is first made in reference to FIGURES 2 and 3. After piston 30 is cocked, spring 26 urges roller 32 against the forward face 44 of trigger 42. If not previously done, the time-setting for time run down is adjusted by rotating knob 6, time-setting gear 112 and thus the time cam 109. To reduce the time-setting cam 108 is rotated counterclockwise and to increase the time-setting cam 108 is rotated clockwise as seen in FIGURE 3. This action moves edge C closer to or farther from the axis of roller 132. Assuming the arm control is in the "off" position, catch plate 46 is retained by pin 17 in order to prevent rotation of plate 46, pin 80 and sector gear 106. With plate 46 in the unarmed position, the red area shows through window 18. After static pin 66 is inserted the arm control knob 13 can be turned to "on" to free catch plate 46 and sector gear 106. Thus, the power from compressed spring 26 is transmitted through pin 118 to sector gear 106 to rotate the same about axis 98. Relative rotation between the power lever 124 and sector gear 106 does not occur as long as roller 132 rides on edge 120 of cam 109. Thus sector gear 106 rotates and roller 132 moves on edge 120 until the action is again restrained by plate 46 contacting the static line pin 66. After the prearm time period and with plate 46 contacting pin 66, the time it would take roller 132 to clear edge 120 is the amount of time shown on time dial 5. With plate 46 in the armed position, the green area shows through window 18 of housing 12 and the jumper can easily see that the device is armed and cocked.

Assuming the jumper is using the altitude-time mode, the desired altitude is (or has previously been) set in aneroid bellows 58 in the manner described and upon reaching an altitude higher than the preset altitude the bellows post 56 penetrates plate 38.

After jumping, the static pin 66 is removed to free plate 46. However, plate 46 is now restrained by bellows post 56 engaging notch 54. As the jumper descends, aneroid bellows 58 draws post 56 inward, and upon reaching the preset altitude, bellows post 56 disengages plate 46 and the timing mechanism is free to run down at the rate determined by the gear train and escapement mechanism. With no restraint applied to sector gear 106, spring 26 causes further rotation thereof and roller 132 moves on edge 120 and approaches the breakaway point C. After the set time period elapses roller 132 overrides the breakaway point at which time power lever 124 is immediately free to rotate about pin 118 to quickly remove trigger 42 from the path of roller 32. With roller 32 free, spring 26 forces piston 30 and cord 28 through the full throw to the release position.

Immediately after roller 32 clears trigger 42, springs 131 return power lever 124 to the reset position relative to sector gear 106. At the same time, coil spring 108 returns sector gear 106 to the reset position thus pulling sector gear post 80, lever 70 and catch plate 46 all back to their respective reset positions. It is apparent that when sector gear 106 is rotated to the reset position, it drives the entire gear train 100 in the reverse direction. When shaft 138 of the reset assembly is rotated in reverse, gear 142 and the escapement assembly 102 remain fixed due to the independent rotation of ratchet gear 136 relative to gear 142.

After the jump is completed, the device may be reused by simply turning the arm control to the "off" position and recocking cable 28 so that roller 32 and piston 30 are drawn forward. Upon contacting the rear face of trigger 42, roller 30 rotates the same counterclockwise in order to clear it. New altitude and time-settings can be adjusted and the device is ready for reuse.

In the event only a time mode is desired, the appropriate setting is made for aneroid bellows 58 whereby bellows post 56 does not penetrate plate 38 to block plate 46 regardless of the jumping altitude. In this mode, a time run down starts immediately upon withdrawal of static pin 66.

The device also permits a pure altitude mode operation whereby the minimum (in one example, one second) is set for timing cam 109. In this mode, bellows post 56 blocks rotation of the plate 46 when static pin 66 is removed and upon reaching the preset altitude, plate 46 is free to rotate and the parachute release occurs one second thereafter.

It should be understood that various modifications can be made to the herein disclosed example of the present invention without departing from the spirit and scope thereof.

What is claimed is:

1. In a parachute release device including a piston, a parachute release cable connected to the piston, spring means biasing said piston to a release position and a release mechanism to hold the piston in a retracted position against the force of the spring means and to release the piston responsive to a predetermined time lapse, the improvement comprising said release mechanism including a timing cam mounted on a fixed axis, said timing cam including a cam surface terminating in a breakaway edge, an arm pivotally mounted on said fixed axis, a cam follower to engage the cam surface and pivotally mounted on said, arm with the pivot axis being spaced from said fixed axis so that pivoting of said arm advances the cam follower toward the breakaway edge, timing means to govern pivoting of said arm, and a trigger coupled to said cam follower and adapted to hold the piston retracted while said cam follower engages said cam surface and to release same responsive to the cam follower overriding the breakaway edge.

2. In a device according to claim 1, the further improvement of means to adjust the position of the cam relative to said fixed axis.

3. In a device according to claim 1, the further improvement of barometric sensing means to block movement of said arm and to release same responsive to sensing a predetermined barometric condition.

4. In a device according to claim 1, the further improvement of reset means to restore the device to its initial status.

5. In a device according to claim 1, the further improvement of an arming control means to block selectively movement of said arm.

6. In a device according to claim 5, the further improvement of a retractable pin succeeding the arming control means to block selectively movement of said arm.

7. In a device according to claim 1, wherein the timing means is comprised of an escapement mechanism.

8. In a device according to claim 7, wherein the escapement mechanism is of the inertial type and is driven by said spring means via said trigger and arm.

9. In a device according to claim 8, wherein the escapement mechanism includes ratchet means to enable reset.

10. A parachute release device comprising a housing, a piston, a release cable connected to the piston, a power spring biasing the piston toward a release position, a power lever including a trigger normally extending into the path of the piston, a first shaft fixed to said housing, a sector gear rotatably mounted about said shaft a second shaft spaced from the first and carried by the sector gear, the power lever being rotatably mounted on the second shaft, a timing cam mounted on said first shaft and having a first surface arcuate generally about the first shaft and a second surface intersecting the first surface forming therewith a breakaway edge, time-setting means for fixing the angular position of the timing cam in any one of a plurality of positions, the power lever including a timing cam follower normally engaging the first surface to prevent rapid rotation of the power lever about the second shaft, said power spring driving the sector gear about the first shaft via the power lever and causing the timing cam follower to engage the first surface and to advance toward the breakaway edge, said power lever being rotated substantially freely about the second shaft after the timing cam follower overrides the breakaway edge, an escapement mechanism means coupled to and driven by the sector gear for controlling the rate at which the timing cam follower moves on the first surface, and restraining means coupled to the sector gear for releasably restraining the rotation of the sector gear, said trigger being quickly withdrawn from the piston path by the rotation of the power lever about the second shaft whereupon the power spring drives the piston to the release position.

11. A device as set forth in claim 10 wherein said restraining means comprises a catch member pivoted about an axis, a lever pivoted about a second axis spaced from the catch member axis, the lever coupled to the catch member such that rotation of the lever causes rotation of the catch member, means coupled from the sector gear to the lever to rotate the lever when the sector gear is rotated, control means engaging the catch member at a point spaced from the catch member axis to releasably restrain the rotation of the catch member and thereby restrain rotation of the lever and sector gear.

12. A device as set forth in claim 11 wherein said control means comprises an arm control means mounted on the housing and movable between off and on positions to block and free, respectively, the rotation of the catch member, said arm control means serving to block the catch member in a prearm position.

13. A device as set forth in claim 12 wherein the control means further comprises a pin releasably held by the housing to prevent rotation of the catch member after it has rotated past the prearm position and to free catch member rotation from static restraint when the pin means is withdrawn from the housing.

14. A device as set forth in claim 13 wherein the control means further comprises an adjustable altitude sensing mechanism to block at a higher than predetermined altitude catch member rotation after it has passed the prearm position and to free at a lower than predetermined altitude catch member rotation from altitude restraint.

15. A device as set forth in claim 14 wherein the catch member is restrained by the pin and altitude sensing mechanism at substantially the same angular position.

16. A device as set forth in claim 10 wherein a reset spring is provided to bias the sector gear for rotation in an opposite direction than that caused by the power spring and wherein said escapement mechanism means comprises a power step-down series gear train having its higher power end geared to the sector gear, a reset ratchet wheel geared to the lower power end including a drive wheel and a ratchet wheel, inertial wheel means, an escapement ratchet driven by the drive wheel to drive the inertial wheel when the sector gear is rotated in one sense by the power spring and to lock the drive wheel in the opposite sense whereupon the ratchet wheel decouples from the drive wheel to enable resetting of the sector gear by the reset spring.

17. A device as set forth in claim 10 wherein [first and third shafts are coaxial, the first shaft being stationary and the third shaft being rotatable,] the timing cam is fixed on a sleeve rotatably carried on said first shaft, said time-setting means comprising a time-setting gear fixed to the sleeve and a gear to rotate the time-setting gear mounted on a time-setting control shaft, means operated from outside the housing to rotate and lock the time-setting control shaft in any one of a plurality of angular positions adjusting accordingly the angular position of the timing cam relative to its follower.

18. A parachute release device comprising a housing, a tube located within the housing having a bumper at one end thereof, a piston riding in said tube, said tube having an elongated slot, a roller, a yoke riding in the slot and connecting the roller to the piston, a parachute release cable extending through the tube and connected to the piston, a power spring positioned in the tube to bias the piston toward the bumper, a pair of mounting plates mounted parallel to each other and stationary within the housing, a time-setting and sector gear assembly mounted between said mounting plates and comprising a first shaft mounted perpendicular to the plates and perpendicular to the travel path of said roller, a sector gear rotatably mounted on said shaft and extending generally parallel to the travel path of said roller, a power lever having first and second legs generally at right angles to each other, a second shaft parallel to the first-mentioned shaft and spaced therefrom mounted on the sector gear, said power lever being rotatably mounted on said second shaft and having its first leg extending toward said roller when the sector gear and power lever are in the reset position, a trigger rotatably mounted at the free end of said first leg and having a surface extending across the path of travel for said roller, said roller bearing against said trigger surface when the piston is fully cocked, said trigger having a shoulder abutting said first leg to prevent rotation of the trigger when the roller engages said trigger surface, said trigger having a rounded part to permit rotation of the trigger when the roller contacts the trigger when it is moving toward the cocked position, a spring biasing the trigger such that the trigger surface abuts said first leg, a timing cam rotatably mounted to the first-mentioned shaft having a first surface arcuate generally about the first-mentioned shaft and a second surface arcuate generally about said second shaft and intersecting said first surface in a breakaway edge, said second leg comprising two parts straddling said timing cam, a pin held by the free ends of said parts and including a timing cam roller which normally bears against said first surface, a first reset spring connected to the housing and the outer part of said pin to reset the power lever, a time-setting gear coupled to said timing cam, a time-setting control knob extending through the housing, a gear coupling said time-setting control knob with said time-setting gear, means for releasably locking said time-setting control knob in any one of a plurality of positions whereby rotation of said time-setting control knob causes the breakaway edge to move toward or away from the timing cam roller, means to limit rotation of the time-setting gear in both the clockwise and counterclockwise directions, a clockwork mechanism comprising a power step-down gear train having its high powered end geared to said sector gear, a reset ratchet assembly having a ratchet and coaxial geared wheel, said ratchet and wheel being independently rotatable relative to one another, pawl means mounted on said wheel for interlocking the ratchet and wheel when the ratchet is driven in the forward direction and permitting the ratchet and wheel to rotate independently when the ratchet is driven in the reset direction, and a unidirectional escapement mechanism geared to said wheel, a catch plate pivoted on the side of one of said mounting plates opposite the time-setting and sector gear assembly, said catch plate lying in a plane generally parallel to the adjacent mounting plate and having an arcuate leading edge defining a depression, said catch plate having an arcuate slot extending from approximately the pivot location outward and toward the time-setting and sector gear assembly location, a lever, a lever shaft mounted in the one mounting plate in alignment with the first-mentioned shaft and the catch plate pivot, said lever rotatably mounted on the lever shaft and extending therefrom over the arcuate slot of the catch plate and having a pin slidably movable within the arcuate slot, said lever having near its pivot end a clamping means, said one mounting plate defining an opening generally between said sector gear and said clamping means, a sector gear post carried by said sector gear extending through said opening and being engaged by said clamping means so that rotation of the sector gear causes rotation of said lever and said catch plate, arm control means coupled to said housing and operative from without to contact the catch plate and prevent rotation thereof when in the prearm position, said arm control means being movable to the "on" position to free the catch plate rotation, a static pin releasably held by said housing and positioned to contact the catch plate after it has rotated a predetermined amount past its prearm position, and aneroid bellows means mounted between the mounting plates and having a bellows post adapted to penetrate said one mounting plate to engage the depression in said mounting plate to block rotation thereof at about the same angular position as when the catch plate is blocked by the static pin, said aneroid bellows means sensing atmospheric conditions and moving the bellows post across the back of the catch plate depression at altitudes above a predetermined altitude and withdrawing the bellows post from the depression path at altitudes below the predetermined altitude, means mounted in said housing and operative from without for varying the predetermined altitude, the housing being provided with a number of windows, first indicating means viewable through one window to indicate the number of seconds for the timing cam roller to override the breakaway edge after the catch plate rotation is freed by the static pin and aneroid bellows means, other indicating means viewable through another window indicating the preset altitude, a pair of color coated areas on said catch plate visible through yet another window to indicate the arm control and cocked conditions, whereby relative rotation between the power lever and sector gear is prevented as long as the timing cam roller rides on the first timing cam surface, rotation of the sector gear causing the timing cam roller to approach the breakaway edge in response to the force of the power spring the rate of timing cam roller movement being determined by the magnitude of the spring force, power train and escapement mechanism and whereby the power lever rotates about said second shaft when said timing cam roller overrides the breakaway edge thereby removing the trigger from the path of the roller connected with said piston.

References Cited

UNITED STATES PATENTS

| | | | |
|---|---|---|---|
| 1,800,575 | 4/1931 | Tofflemire | 244—150 |
| 2,584,164 | 2/1952 | Stallan | 244—150 |
| 2,960,297 | 11/1960 | Cotter et al. | 244—150 |
| 3,013,834 | 12/1961 | Minicucci | 294—83 |
| 3,291,424 | 12/1966 | Hatfield et al. | 244—149 |

FOREIGN PATENTS

| | | |
|---|---|---|
| 1,046,036 | 7/1953 | France. |
| 139,195 | 5/1961 | U.S.S.R. |

MILTON BUCHLER, Primary Examiner

R. A. DORNON, Assistant Examiner

U.S. Cl. X.R.

74—2; 294—83